(12) United States Patent
Szepessy et al.

(10) Patent No.: US 7,927,395 B2
(45) Date of Patent: Apr. 19, 2011

(54) CENTRIFUGAL SEPARATOR

(75) Inventors: Stefan Szepessy, Huddinge (SE); Olle Törnblom, Tumba (SE)

(73) Assignee: Alfa Laval Corporate AB, Lund (SE)

( * ) Notice: Subject to any disclaimer, the term of this patent is extended or adjusted under 35 U.S.C. 154(b) by 242 days.

(21) Appl. No.: 12/262,561

(22) Filed: Oct. 31, 2008

(65) Prior Publication Data

US 2010/0011723 A1 Jan. 21, 2010

(30) Foreign Application Priority Data

Jul. 16, 2008 (SE) ...................................... 0801695

(51) Int. Cl.
*B01D 46/18* (2006.01)
(52) U.S. Cl. ................ 55/406; 55/400; 55/401; 55/402; 55/403; 55/404; 55/405; 55/407; 55/447; 55/467; 55/455; 55/385.3; 55/424; 55/428; 55/451; 55/423
(58) Field of Classification Search ............ 55/400–407, 55/447, 467, 455, 385.3, 424, 428, 451, 423
See application file for complete search history.

(56) References Cited

U.S. PATENT DOCUMENTS

| 2,104,683 | A | * | 1/1938 | Van Rosen et al. ............. 55/403 |
| 2,335,420 | A | * | 11/1943 | Jones ........................... 184/6.24 |
| 3,234,716 | A | * | 2/1966 | Sevin et al. ................. 210/360.1 |
| 4,175,937 | A | * | 11/1979 | Brandau et al. ................. 55/419 |
| 4,198,218 | A | * | 4/1980 | Erickson ........................ 55/408 |
| 5,735,789 | A | * | 4/1998 | Borgstrom et al. ............. 494/70 |
| 6,547,862 | B2 | * | 4/2003 | Dean ............................... 96/174 |
| 6,821,319 | B1 | * | 11/2004 | Moberg et al. ................... 95/270 |
| 6,973,925 | B2 | * | 12/2005 | Sauter et al. .................. 123/572 |
| 7,022,163 | B2 | * | 4/2006 | Olsson et al. ................... 95/268 |
| 7,156,901 | B2 | * | 1/2007 | Hallgren et al. ................ 95/270 |
| 7,235,177 | B2 | * | 6/2007 | Herman et al. ............ 210/360.1 |

(Continued)

FOREIGN PATENT DOCUMENTS

SE 515 302 C2 7/2001

OTHER PUBLICATIONS

International-Type Search Report (ITS-Report) for SE0801695-8, filing date Jun. 16, 2008. International Search Request No. ITS/SE08/00306.

*Primary Examiner* — Jason M Greene
*Assistant Examiner* — Dung Bui
(74) *Attorney, Agent, or Firm* — Michaud-Kinney Group LLP

(57) ABSTRACT

The invention relates to a centrifugal separator for cleaning of gas from solid or liquid particles suspended therein which are of greater density than the gas. A main object of the present invention is to accomplish a centrifugal separator which does not have said inactive regions and thereby achieves efficient separation of particulate contaminants from a gas. This object is achieved by the centrifugal separator initially defined, which is characterised in that the interspaces between the separation discs at least at their radially outer parts are substantially open for flow of the gas in the circumferential direction and that mutually adjacent separation discs are arranged at mutual spacing such that rotation of the rotor causes a pumping action in the interspaces, which pumping action drives the gas from the gas inlet, through the interspaces between the separation discs and out via the gas outlet.

12 Claims, 2 Drawing Sheets

U.S. PATENT DOCUMENTS

| | | | |
|---|---|---|---|
| 7,338,546 B2* | 3/2008 | Eliasson et al. | 55/406 |
| 7,445,653 B2* | 11/2008 | Trautmann et al. | 55/345 |
| 7,476,266 B2* | 1/2009 | Hallgren et al. | 55/406 |
| 7,632,326 B2* | 12/2009 | Stemmer | 55/400 |
| 7,682,415 B2* | 3/2010 | Mueller et al. | 55/434 |
| 2003/0233939 A1* | 12/2003 | Szepessy et al. | 95/270 |
| 2004/0159085 A1* | 8/2004 | Carlsson et al. | 55/406 |
| 2005/0119020 A1 | 6/2005 | Cheng et al. | |
| 2005/0198932 A1* | 9/2005 | Franzen et al. | 55/406 |
| 2007/0001232 A1 | 1/2007 | King et al. | |
| 2007/0163215 A1* | 7/2007 | Lagerstadt | 55/406 |
| 2008/0264251 A1* | 10/2008 | Szepessy | 95/35 |
| 2009/0000258 A1* | 1/2009 | Carlsson et al. | 55/400 |
| 2009/0013658 A1* | 1/2009 | Borgstrom et al. | 55/447 |

* cited by examiner

US 7,927,395 B2

CENTRIFUGAL SEPARATOR

CROSS REFERENCE TO RELATED APPLICATION

This application claims priority to Swedish Patent Application No. 0801695-8 filed on Jul. 16, 2008, the subject matter of this patent document is incorporated by reference herein in its entirety.

FIELD OF THE INVENTION

The present invention relates to a centrifugal separator for cleaning of gas from solid or liquid particles suspended therein which are of greater density than the gas. The centrifugal separator comprises a rotor housing which delimits a separation chamber and which has a gas inlet to the separation chamber and a gas outlet from the separation chamber. The centrifugal separator further comprises a rotor which by means of a driving device is rotatable around a rotational axis and which is adapted, during operation, to bring the gas into rotation in the separation chamber, wherein the rotor comprises a stack of frustoconical separation discs which are disposed coaxially with one another and concentrically with the rotational axis and which by means of spacing elements are disposed at mutual spacing such that they delimit between them interspaces for gas to flow through. An inlet space is arranged centrally in the stack of separation discs and communicates with the gas inlet and with radially inner parts of the interspaces between the separation discs. An annular flow space surrounds the rotor and is delimited radially by the rotor housing, which annular flow space communicates with radially outer parts of the interspaces between the separation discs and with the gas outlet.

BACKGROUND THE INVENTION

The invention is primarily intended to be usable for cleaning of so-called crankcase gases, i.e. gases formed in a combustion engine, from particles in the form of oil and/or soot. It may alternatively be used in other contexts, such as cleaning of air in various industrial premises in the engineering industry, within the chemical industry or, for example, for cleaning the air around various types of machine tools.

A centrifugal separator of the type indicated in the introduction is known from patent specification SE 515 302 C2, in which each of the conical separation discs, on their inside, have contact with or are connected to elongate guiding means which each extend at an angle with respect to generatrices of the respective separation disc from a point at a first distance from the axis of rotation of the rotor to a point at a larger second distance from the axis of rotation of the rotor. The guiding means—which may also take the form of spacing elements, i.e. guiding means which bridge the interspaces between mutually adjacent separation discs in order to form said interspaces between the separation discs—end in the vicinity of the respective separation disc's circumferential edge at a distance from one another along the circumferential edge. Said guiding means (spacing elements) gather up the separated particles, which are caused to leave the guiding means and are thrown from the separation discs substantially only in limited regions situated at a distance from one another along the circumferential edges of the respective separation discs.

It has been found, however, that separation discs with elongate spacing elements (irrespective of whether the spacing elements are straight and purely radial, are straight and form an angle with the radius or are curved), especially in concurrent flow separation, may have inactive regions on the surface of the separation discs, i.e. regions which make a relatively slight or no contribution at all to the separation of particles from the gas. Such inactive regions occur mainly at the radially outer parts of the interspaces and—depending on the direction of rotation—directly behind or in front of the respective spacing elements as viewed in the direction of rotation. Radially outer parts of the interspaces means in principle the radially outer half of the conical portion of the separation disc. This means that not all of the surface of the separation disc is used for separation of particles, with consequently reduced separation efficiency of the separation disc.

SUMMARY OF THE INVENTION

A main object of the present invention is to accomplish a centrifugal separator which does not have said inactive regions and thereby achieves efficient separation of particulate contaminants from a gas.

This object is achieved by the centrifugal separator initially defined, which is characterised in that the interspaces between the separation discs at least at their radially outer parts are substantially open for flow of the gas in the circumferential direction and that mutually adjacent separation discs are arranged at mutual spacing such that rotation of the rotor causes a pumping action in the interspaces, which pumping action drives the gas from the gas inlet, through the interspaces between the separation discs and out via the gas outlet.

Radially outer parts means in principle the radially outer half of the interspaces on the conical portions in the stack of separation discs.

A further object of the invention is to accomplish a centrifugal separator with separation discs which are easy/inexpensive to make and which at the same time provide efficient separation of particles from gas.

A further object of the invention is to accomplish a centrifugal separator which comprises a rotor with separation discs which exhibit even interspaces for gas to flow through.

A further object of the invention is to accomplish a centrifugal separator with a rotor which exhibits a good pumping action.

These further objects are achieved by the embodiments defined below.

According to an embodiment of the invention, the separation discs are provided with a plurality of spacing elements which are arranged in said interspaces and are substantially punctiform. Hereby it is provided—in an easy and inexpensive manner —interspaces which are open for flow in the circumferential direction.

According to a further embodiment of the invention, the spacing elements have an outer diameter D and a height H and D/H being≦15. The outer diameter D of the spacing elements is thus in practice substantially greater than the height H. The outer diameter of the spacing elements should preferably be as small as possible so that the interspaces will be as open as possible for flow of the gas in both the circumferential direction and the radial direction. For manufacturing reasons, however, there is a limit to how small the outer diameter of the spacing elements can be made.

According to a further embodiment of the invention, the spacing elements are made integral with the respective separation disc. Separation discs with integrated spacing elements may with advantage be used, for example, in the case of separation discs made of plastic—e.g. separation discs made by injection moulding—since integrated spacing elements can easily be incorporated in the separation disc production process.

According to a further embodiment of the invention, the spacing elements have the form of separate elements attached firmly to each separation disc. Such separate spacing elements may with advantage be used in the case of separation discs made of metal. The frustoconical shape of such separation discs is usually achieved by so-called pressure rolling of flat circular metal blanks, followed by separate spacing elements being fixed—e.g. by spot welding—on the surface of each separation disc after the pressure rolling.

According to a further embodiment of the invention, the spacing elements are distributed along a number of specified radial distances from the rotational axis in the interspaces between the separation discs, each interspace having a number of rings of punctiform spacing elements at said specified radii. The result is even spacing throughout the interspaces, which result in an even distribution of the gas which flows through the interspaces.

According to a further embodiment of the invention, the spacing elements in any given ring are displaced in the circumferential direction relative to the spacing elements in an adjacent ring. Hereby it is provided further assurance of even spacing throughout the interspaces.

According to a further embodiment of the invention, at least the radially outer parts of the interspaces lack said spacing elements. In this case the radially outer parts of the interspaces are fully open for flow of the gas in both the radial direction and the circumferential direction. This may with advantage be applied in the case of rigid separation discs whose rigidity ensures even spacing in the radially outer parts, i.e. no substantial deformation of the separation discs occur during operation of the centrifugal separator.

According to a further embodiment of the invention, the separation discs have at their radially inner parts of the interspaces a plurality of elongate spacing elements. Situating such spacing elements in the radially inner parts of the interspaces results in open flow of the gas in the radially outer parts of the interspaces. At the same time, such elongate spacing elements cause an increased pumping action on the rotor and increase the entrainment of the gas in the rotation of the rotor.

According to a further embodiment of the invention, the separation discs at their radially outer parts of the interspaces have only punctiform spacing elements. This may with advantage be applied in the case of separation discs made of less rigid material, wherein the spacing elements provide assurance of even spacing throughout the interspaces in the radially outer parts and at the same time provide free flow of the gas in both the radial direction and the circumferential direction.

According to a further embodiment of the invention, the separation discs at their both radially outer and inner parts of the interspaces have only punctiform spacing elements, thereby providing—in a simple manner—even interspaces in the case of less rigid separation discs.

According to a further embodiment of the invention, the separation discs have planar portions which comprise spacing elements, the conical portions of the separation discs lacking said spacing elements at their both radially outer and inner parts of the interspaces. Accordingly the interspaces are fully open for flow of the gas in both the radial direction and the circumferential direction throughout the interspaces. This can with advantage be applied in the case of separation discs with high rigidity which provides assurance of even interspaces in both the radially outer and inner parts, i.e. no substantial deformation of the separation discs occur during operation of the centrifugal separator.

BRIEF DESCRIPTION OF THE DRAWINGS

The invention will now be explained in greater detail by a description of various embodiments and with reference to the accompanying schematic drawings which show the details needed for understanding the invention.

DETAILED DESCRIPTION OF VARIOUS EMBODIMENTS

Figure 1:
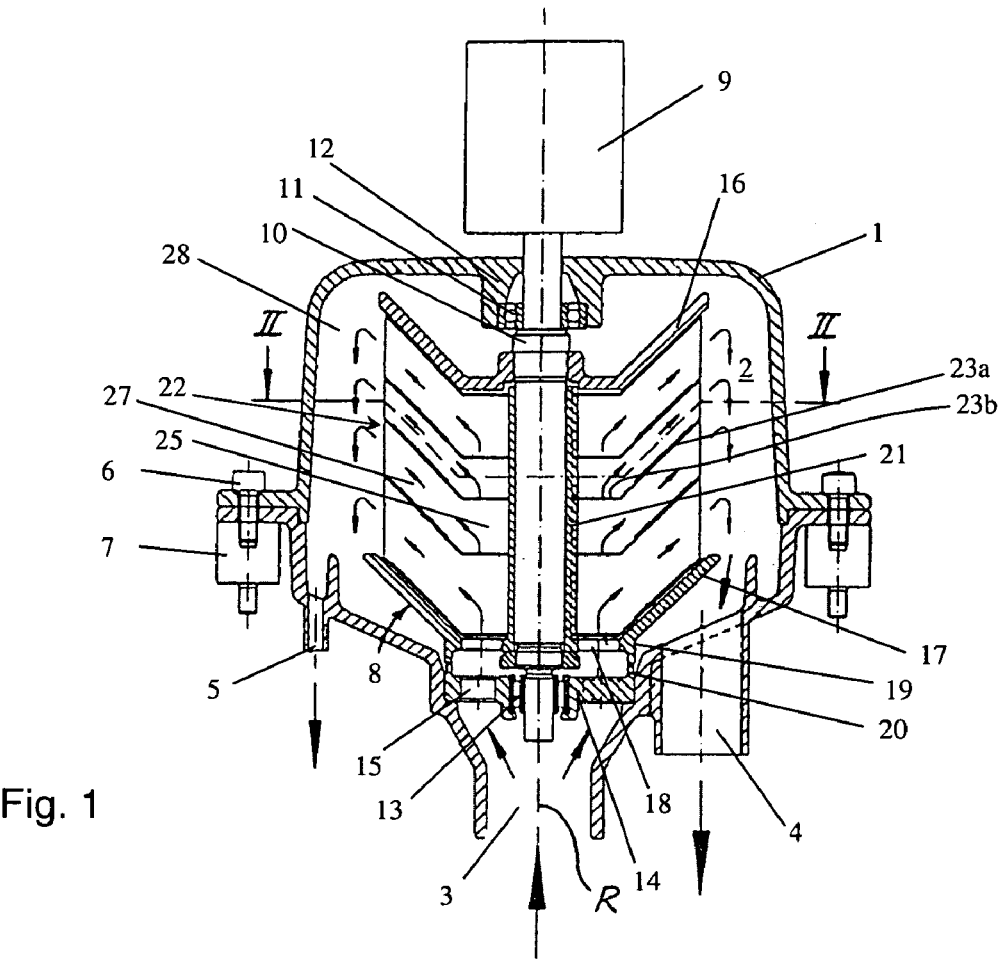
FIG. 1 shows a longitudinal section through a centrifugal separator according to the invention.

In the drawing, FIG. 1 shows a sectional view of a centrifugal separator in which the invention may be applied. This centrifugal separator is intended for cleaning of a gas from particles suspended therein which are of greater density than the gas. The centrifugal separator comprises a stationary rotor housing 1 which delimits a separation chamber 2. The rotor housing has a gas inlet 3 to the separation chamber 2 for gas which is to be cleaned and a gas outlet 4 from the separation chamber 2 for cleaned gas. The rotor housing further has a particle outlet 5 from the separation chamber 2 for particles separated from the gas.

The rotor housing 1 comprises two parts (an upper and a lower part) held together by means of a number of screws 6. These screws 6 also are adapted to keep the rotor housing fastened to a suspension members 7 which is made of some elastic material, through which the rotor housing may be supported by a support (not shown).

Within the separation chamber 2 there is arranged a rotor 8 rotatable around a vertical rotational axis R. A motor 9, e.g. an electric or hydraulic motor, is mounted on the upper part of the rotor housing and connected to the rotor 8 for its rotation. The rotor 8 comprises a vertically extending central spindle 10 which at its upper end is journalled in the rotor housing 1 through an upper bearing 11 and an upper bearing holder 12, and at its lower end journalled in the rotor housing 1 through a lower bearing 13 and a lower bearing holder 14. The lower bearing holder 14 is situated in the gas inlet 3 of the rotor housing and is therefore provided with through holes 15 for incoming gas which is to be cleaned in the separation chamber 2.

The rotor 8 further comprises an upper end wall 16 and a lower end wall 17, which two end walls are of frustoconical shape and are connected to the central spindle 10. The lower frustoconical end wall 17 has a planar central portion provided with through holes 18 so that the inside of the rotor can communicate with the gas inlet 3. The lower end wall 17 is further provided, at the outer circumferential edge of the planar portion, with an annular flange 19 extending axially downwards and which is adapted to co-operate with a similar upward-directed annular flange 20 of the bearing holder 14, so that gas entering through the gas inlet 3 is guided into the inside of the rotor 8 through the aforementioned holes 18.

Figure 2:
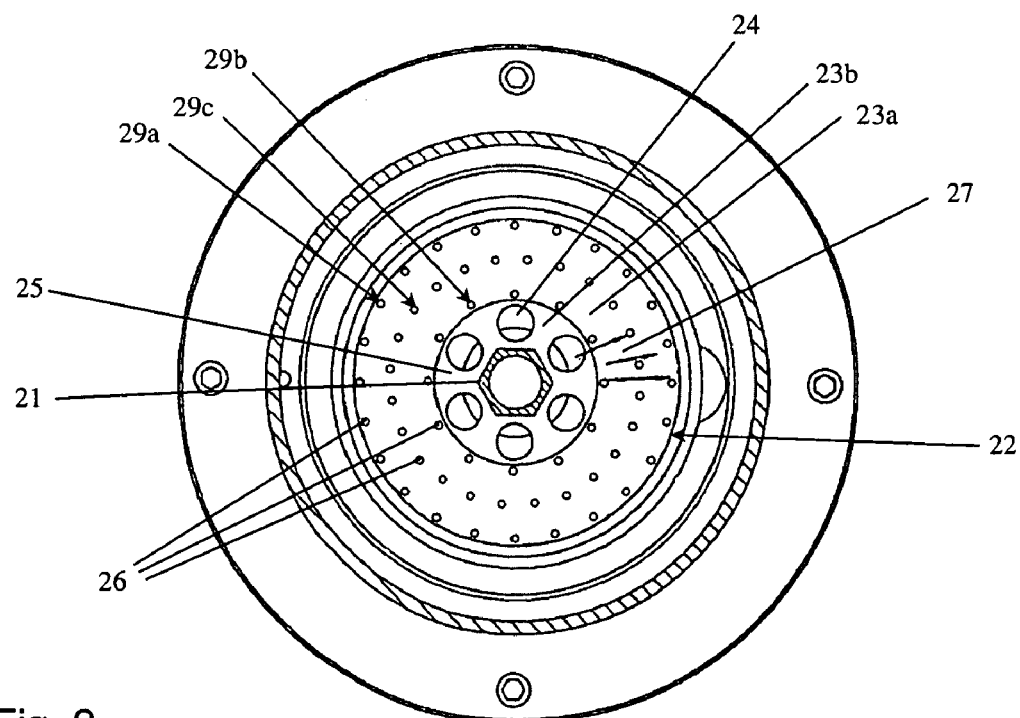
FIG. 2 shows a section along the line II-II in FIG. 1 according to a first embodiment of the invention.

The lower end wall 17 is joined to a hollow column 21 which extends axially upwards from the end wall 17 and which sealingly surrounds the central spindle 10. The column extends all the way up to the upper endwall 16. In the region of the column 21, the central spindle 10 is cylindrical, preferably, for cost reasons, circular cylindrical, and the inside of the column 21 may be configured in the same way as the outside of the spindle, as shown in FIG. 1 and 2. The outside of the column 21 may have a non-circular cross-sectional shape, as can be seen from FIG. 2, in order to provide a rotational connection between the column and a number of separation discs (described in more detail below) stacked on the column. In the embodiment shown, the outside of the column has the shape of a hexagon, but the same rotational connection can of course be achieved with other polygonal shapes, e.g. by a square or triangular shape. Alternatively, the outside of the column may have a circular cross-sectional shape, in which case said connection is provided by one or more ribs extending axially along the outside of the column, said ribs being adapted to engaging in corresponding grooves in said separation discs.

A stack of frustoconical separation discs 22 is arranged between the end walls 16 and 17, which separation discs between them delimit interspaces 27 for gas to flow through. Each of the separation discs 22 has a frustoconical portion 23a and, formed integrally with the latter, a planar portion 23b nearest to the column 21. The planar portion 23b is, as shown in FIG. 2, formed to be able to engage with the non-circular column 21 in such a way that the respective separation disc cannot rotate relative to the column 21. Furthermore, the planar portion 23b is provided with a number of through holes 24, as shown in FIG. 2. Irrespective of whether the holes 24 in the respective separation discs 22 are aligned axially with each other or not, they form together with the interspaces between the planar portions 23b of the separation discs 22 a central inlet space 25 within the rotor 8 (see FIG. 1), which communicates with the gas inlet 3 and with radially inner parts of the interspaces 27 between the conical portions 23a of the separation discs. The separation chamber 2 comprises an annular flow space 28 surrounding the rotor 8 and delimited radially by the stationary rotor housing 1. The annular flow space 28 communicates with the radially outer parts of the interspaces 27 between the separation discs 22 and with the gas outlet 4. The central inlet space 25 of the rotor is thus in communication with the annular flow space 28 via the interspaces 27.

For the sake of clarity, the drawing shows only a small number of separation discs 22 with large axial interspaces 27. In practice, considerably more separation discs 22 are preferably arranged between the end walls 16 and 17, so that relatively thin interspaces 27 are formed between the separation discs. The separation discs are arranged at such mutual distance that rotation of the rotor causes in the interspaces 27 a pumping action which drives the gas from the gas inlet 3, through the interspaces 27 between the separation discs 22 and out via the gas outlet 4. Hereby, the distance between the separation discs—i.e. the height of the interspaces—may for example be of the order of 0.1-2 mm. The distance between the separation discs is preferably of the order of 0.2-0.6 mm or, still better, between 0.3-0.5 mm. The distance may vary depending on the type of contaminants to be cleaned—in other words in what area of use for gas cleaning the centrifugal separator is to be used—and on the size of the centrifugal separator itself. Too great a distance between the separation discs 22 may cause problems in the form of too little pumping action for driving the flow through the centrifugal separator by means of rotation of the rotor, whereas too small a distance may cause separated contaminants to be caught in said interspaces 27 and block the gas flow between the separation discs 22. In the crankcase gas cleaning application, the present invention applies with advantage a distance of 0.4 mm.

FIG. 1 shows a centrifugal separator with a stack of separation discs whose planar portions 23b are in a lower plane than their conical portions 23a. The separation discs in the stack might of course also face in the other direction, as also the end walls 16 and 17. In the shown embodiment the rotor housing is stationary. The invention is however not limited to stationary rotor housings, since it is also applicable in such centrifugal separators which have rotor housings which rotate jointly with the rotor 8.

FIG. 2 shows—according to a first embodiment of the invention—the side of a separation disc 22 which faces upwards in FIG. 1. This side is hereinafter called the inside of the separation disc, since it faces inwards towards the rotational axis of the rotor. As can be seen, the separation disc 22 is provided on its inside (alternatively on the outside) with a plurality of punctiform spacing elements 26 (which, unlike elongate spacing elements, do not have any substantial extension in a particular direction) adapted to forming said interspaces 27 for gas to flow through between the respective separation disc and the next separation disc up in the stack of discs. The interspaces 27 are thus open for flow of the gas in both the circumferential direction and the radial direction, i.e. the interspace presents to the gas which is to be cleaned substantially no obstacle to flow in the circumferential direction. Punctiform spacing elements means in principle spacing elements which have an outer diameter D and height H and $D/H$ being $\leq 15$. The outer diameter D of each spacing element is thus in practice substantially greater than the height H. Preferably, however, the outer diameter of the spacing elements should be as small as possible so that the interspaces will be as open as possible for flow of the gas in both the circumferential direction and the radial direction. Partly for manufacturing reasons, however, there is a limit to how small the outer diameter of the spacing elements can be made. The distance between the separation discs is determined by the height H of the spacing elements. In the first embodiment shown, the punctiform spacing elements 26 are evenly distributed along three specified radial distances from the rotational axis R—i.e. in rings 29a, 29b and 29c—on the conical portion of each separation disc. In the embodiment shown, the punctiform spacing elements 26 in any given ring 29a are displaced in the circumferential direction relative to the punctiform spacing elements 26 in a radially adjacent ring 29c in such a way that each pair of punctiform spacing elements 26 in respective adjacent rings 29a, 29c are arranged along a line which forms an angle with respect to the radius of the separation disc. Such a distribution of spacing elements 26 may preferably be used in the case of separation discs made of relatively thin and flexible material—e.g. separation discs made of thin plastic—to provide, during operation of the centrifugal separator, assurance of even axial spacing throughout the interspace 27 between two separation discs 22. In the embodiment shown, the punctiform spacing elements 26 are distributed in a first ring 29a close to the radially outer circumferential edge of the separation disc, in a second ring 29b close to a radially inner circumferential edge of the conical portion of the separation disc, and in a third ring 29c midway between the first and second rings. Hereby, the punctiform spacing elements 26 of the third ring 29c are displaced in the circumferential direction relative to the punctiform spacing elements of the first ring 29a and the second ring 29b. The number of rings and punctiform spacing elements is adapted according to the size and rigidity of the separation disc. A relatively large separation disc—i.e. a separation disc with a relatively large radial extent—comprises preferably a larger number of rings and spacing elements than a smaller separation disc. A relatively rigid separation disc—i.e. a separation disc made of relatively more rigid material—comprises preferably a smaller number of rings and spacing elements than a separation disc made of relatively less rigid material.

Figure 3:
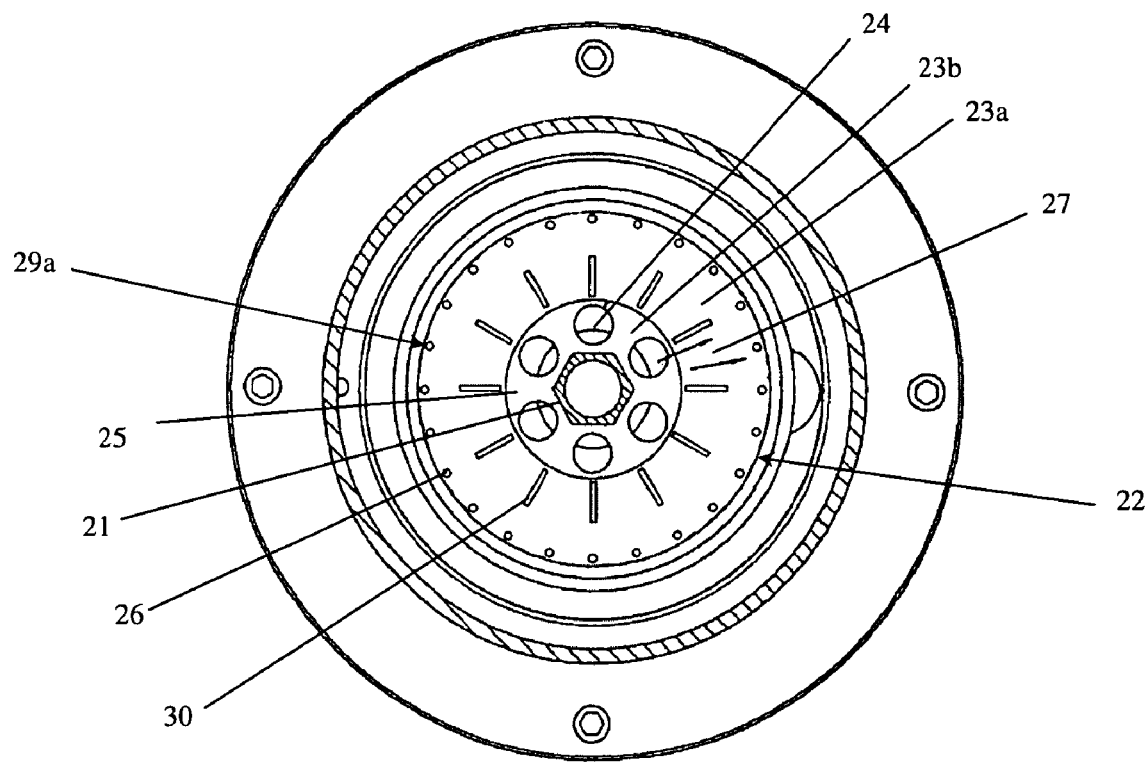
FIG. 3 shows a section along the line II-II in FIG. 1 according to a second embodiment of the invention.

FIG. 3 shows—according to a second embodiment of the invention—the side of a separation disc 22 which faces upwards in FIG. 1. This separation disc 22 is provided on its inside with a plurality of punctiform spacing elements 26 evenly distributed in a ring 29a close to the radially outer circumferential edge of the separation disc, wherein a radially inner part of the conical portion of the separation disc is provided with a plurality of elongate spacing elements 30. The interspace 27 is thus open in at least its radially outer part for flow of the gas in the circumferential direction. Hereby the elongate spacing elements 30 do not block flow of the gas in the circumferential direction in the radially outer parts of the interspaces. The formation of said inactive regions on the surface of the separation disc is thus prevented. In this embodiment of the invention, the separation disc thus comprises a plurality of elongate spacing elements which extend in a rectilinear manner in the radial direction. The elongate spacing element may however also extend at an angle to the radius of the separation disc, in which case they may be both straight and curved. The design provides a good pumping action without any disturbance of the flow in the radially outer parts of the interspaces.

Figure 4:
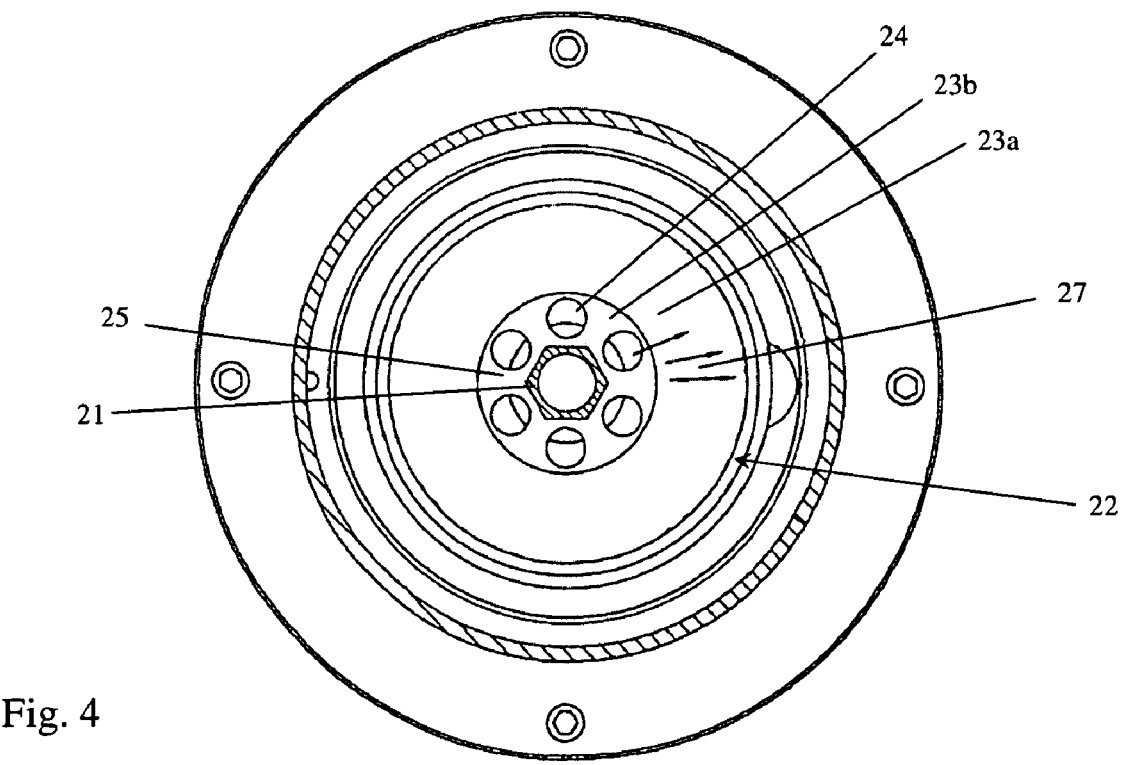
FIG. 4 shows a section along the line II-II in FIG. 1 according to a third embodiment of the invention.

FIG. 4 shows—according to a third embodiment of the invention—the side of a separation disc 22 which faces upwards in FIG. 1. This separation disc 22 has a completely smooth surface, i.e. a surface with no spacing elements, along at least the conical portion 23a of the separation disc. The interspaces 27 are thus open for flow of the gas in the circumferential direction in both the radially outer parts and the radially inner parts of the interspaces. Hereby the separation disc has no spacing elements that might block flow of the gas in the circumferential direction, whereby the formation of said inactive regions on the surface of the separation disc is prevented. In this embodiment, the spacing elements 30 may be incorporated in the planar portion 23b of the separation disc or alternatively comprise separate elements disposed in the planar portion 23b of the separation disc between mutually adjacent separation discs. It is also possible to conceive of the separation discs being stacked on a rotor which comprises a number of axially elongate rods evenly distributed in the circumferential direction, in which case the separation discs are provided with apertures running through them for the rods, which rods are adapted to cooperating with the rotor's endwalls 16, 17. Hereby, the outer circumferential edges of the separation discs may be provided with lugs which have apertures running through them for the rods, in which case the lugs are provided with spacing elements in the form of washers to form the interspaces between the separation discs. Similar stacking of separation discs with rods is known from, for example, U.S. Pat. No. 2,104,683 A, which is cited as reference. Instead of lugs, the separation discs may comprise an outer rim extending radially and horizontally from the conical portion and provided with apertures running through it for rods. Such an outer rim also results in increased rigidity of the separation disc.

The separation discs described and shown may be made of various materials, such as plastic and/or metal materials. To increase the rigidity of separation discs made of plastic, various types of fibres—e.g. glass fibres and/or carbon fibres—and various quantities of them may be incorporated in the plastic material, in which case the rigidity of the plastic material increases with the amount of fibres incorporated in the plastic. The separation discs may comprise layers of different materials. An example of such a separation disc comprising layers of different materials is known from WO 2007/001232 A1 referring to a centrifugal separator which works with combined centrifugal force and electrostatic force. The present invention may also be applied to this type of centrifugal separator. Such a centrifugal separator is also known from WO 2005/119020 A1. In such cases the respective separation disc 22 may comprise a surface layer of electrically conductive material on the inside of the separation disc (the side facing inwards towards the rotor's rotational axis R) and/or the outside of the separation disc (the side facing outwards from the rotor's rotational axis R), wherein the centrifugal separator comprises an electrostatic supplementary separator with a first pole element which charges the particles in the gas with a potential, wherein said surface layer of electrically conductive material on the respective separation disc forms a second pole element which has a potential such that an electrostatic force cooperates with the centrifugal force to separate particles from the gas flowing through the interspaces 27 between the separation discs 22. Apart from said electrically conductive surface layer, the separation disc is preferably made of an electrically insulating material.

Depending on the area of use, the conical portion 23a of the separation discs 22 described above may be at different angles relative to the rotational axis R, e.g. angles of between 35°-55°. With regard to solid particles, account has to be taken of their so-called angle of repose in each particular case. Crankcase gas cleaning preferably involves using separation discs comprising a conical portion 23a at an angle of 45° relative to the rotational axis R.

The centrifugal separator described above and shown in the drawings works in the following manner when cleaning a gas from particles suspended therein. By means of the motor 9 the rotor 8 is kept in rotation (typical speed about 2,000-20,000 rpm), wherein the gas in said interspaces 27 is entrained by means of the rotor's separation discs. The interspaces 27 between the separation discs 22 exhibit such a distance as to cause a pumping action which drives the gas through the centrifugal separator. Such a pumping action can be strengthened by arranging elongate spacing elements in the radially inner parts of the interspaces (see for example FIG. 3). Gas polluted with particles is led into the stationary rotor housing 1 from below through the gas inlet 3 and is led on into the rotor's central inlet space 25. From there the gas flows into and radially outwards through the interspaces 27 between the separation discs 22.

In the interspaces 27, the particles suspended in the gas are caused by centrifugal force to move towards and into contact with the insides of the separation discs, i.e. the sides of the conical separation discs 22 which face towards the rotational axis (the sides facing upwards in FIG. 1). Upon contact with the separation discs 22, the particles will be entrained by them and thereafter be influenced by centrifugal force so that the particles are caused to move radially outwards along the insides of the separation discs and proceed towards the latter's outer circumferential edges. Thereafter the particles are thrown from the rotor towards the inside of the rotor housing, after which the force of gravity causes them to leave the rotor housing 1 via said particle outlet 5. The movement of the particles radially outwards via the interspaces 27 is illustrated by means of arrows in FIGS. 2-4.

During its movement radially outwards, the gas brought into rotation will—owing to a certain rotation speed lag relative to the rotor—flow along curved paths in the interspace 27 between the separation discs 22. As the interspaces 27 between the separation discs 22 in at least their radially outer parts are open for flow of the gas in the circumferential direction, the gas will flow freely in the circumferential direction and therefore not be blocked in its movement along the curved paths. Thereby the whole surface of the separation disc is used for separation, since the free flow does not give rise to said inactive regions on the separation disc 22.

The cleaned gas leaves the interspaces 27 and flows on out through the gas outlet 4 via the annular flow space 28. The rotor's central inlet space 25 is thus in communication with the annular flow space 28 via the interspaces 27. The centrifugal separator thus works according to the so-called concurrent flow principle for separation of particles from gas, i.e. the gas which is to be cleaned is led centrally into the rotating rotor and then flows radially outwards through the interspaces 27 between the separation discs 22, wherein the particles in the gas—by centrifugal force—is caused to sediment on the insides of the separation discs and thereafter slide out, in the same direction as the gas flow, towards the outer circumferential edges of the separation discs and then be thrown towards the inside of the rotor housing.

As a consequence of the rotor rotation the gas flowing through the interspaces between the separation discs will get an increased pressure. Thus a higher pressure prevails in the annular flow space 28 which surrounds the rotor 8 and in the area of the gas outlet 4 than in the central space 25 and in the gas inlet 3. This means that a possible leak between the flanges 19 and 20 does not have any substantial importance. Contaminated gas can therefore not flow between the flanges 19 and 20 directly from the gas inlet 3 to the gas outlet 4, but, instead some cleaned gas will flow back into the central space 25.

The invention is not limited to the embodiments disclosed but may be varied and modified within the scope of the following claims.

The invention claimed is:

1. A centrifugal separator for cleaning of gas from solid or liquid particles suspended therein which are of greater density than the gas, which centrifugal separator comprises:
    a rotor housing which delimits a separation chamber and has a gas inlet to the separation chamber and a gas outlet from the separation chamber,
    a rotor which by means of a driving device is rotatable around a rotational axis and adapted, during operation, to bring the gas into rotation in the separation chamber, wherein the rotor comprises a stack of frustoconical separation discs which are disposed coaxially with one another and concentrically with the rotational axis and which by means of spacing elements are arranged at mutual spacing such that they delimit between them interspaces for gas to flow through,
    an inlet space arranged centrally in the stack of separation discs, which inlet space communicates with the gas inlet and with radially inner parts of the interspaces between the separation discs, and
    an annular flow space which surrounds the rotor and is delimited radially by the rotor housing, which annular flow space communicates with radially outer parts of the interspaces between the separation discs and with the gas outlet; and
    the interspaces have substantially no obstruction to flow in the circumferential direction throughout the entire outer radial parts of the interspaces and that mutually adjacent separation discs are arranged at mutual spacing such that rotation of the rotor causes in the interspaces a pumping action which drives the gas from the gas inlet, through the interspaces between the separation discs and out via the gas outlet.

2. A centrifugal separator according to claim 1, wherein the separation discs are provided with a plurality of spacing elements, which are substantially punctiform, arranged in said interspaces.

3. A centrifugal separator according to claim 2, wherein the spacing elements have an outer diameter D and a height H and D/H being $\leq 15$.

4. A centrifugal separator according to claim 1, wherein the spacing elements are made integrally with the separation disc.

5. A centrifugal separator according to claim 1, wherein the spacing elements have the form of separate elements fastened to the separation disc.

6. A centrifugal separator according to claim 2, wherein the spacing elements are distributed along a number of specified radial distances from the rotational axis in the interspaces between the separation discs, each interspace comprising a number of rings of punctiform spacing elements on said specified radii.

7. A centrifugal separator according to claim 6, wherein the spacing elements in any given ring are displaced in the circumferential direction relative to the spacing elements in an adjacent ring.

8. A centrifugal separator according to claim 1, wherein that at least the radially outer parts of the interspaces lack said spacing elements.

9. A centrifugal separator according to claim 1, wherein the separation discs have a plurality of elongate spacing elements at their radially inner parts of the interspaces.

10. A centrifugal separator according to claim 1, wherein the separation discs have only punctiform spacing elements at their radially outer parts of the interspaces.

11. A centrifugal separator according to claim 1, wherein the separation discs have only punctiform spacing elements at their both radially outer and inner parts of the interspaces.

12. A centrifugal separator according to claim 1, wherein the separation discs have planar portions which comprise spacing elements, the conical portions of the separation discs lacking said spacing elements at their both radially outer and inner parts of the interspaces.

* * * * *